United States Patent [19]

Kelley

[11] Patent Number: 4,494,764
[45] Date of Patent: Jan. 22, 1985

[54] MOTORCYCLE LIFT AND METHOD

[76] Inventor: Richard W. Kelley, 667 Blaine Ave. NE., Renton, Wash. 98056

[21] Appl. No.: 461,622

[22] Filed: Jan. 27, 1983

[51] Int. Cl.³ ............................ B62H 1/02; B62H 1/06
[52] U.S. Cl. ..................................... 280/293; 280/298; 280/301; 280/304
[58] Field of Search .............. 280/303, 301, 300, 298, 280/293, 304; 248/352

[56] References Cited

U.S. PATENT DOCUMENTS 1,435,625  11/1922  Schwinn ............................ 280/301
3,039,792  6/1962   Wood ................................. 280/302

FOREIGN PATENT DOCUMENTS 310376  2/1930   United Kingdom ................ 280/301
540387  10/1941  United Kingdom ................ 280/303

Primary Examiner—John A. Pekar
Attorney, Agent, or Firm—Delbert J. Barnard; Joan H. Pauly

[57] ABSTRACT

A support leg (24) is attached to a rear portion (12) of the frame (10) of a motorcycle (2) on the same side of the frame (10) as the kickstand (8), between the kickstand (8) and the rear wheel (6). A pair of laterally spaced ears (42) project upwardly from the upper end of the leg (24). A screw (46) extends through coaxial holes (44) in the ears (42) and a preexisting hole (14) in the frame (10) to attach the leg (24). The lift stand (22) has a support position in which the leg (24) extends downwardly and forwardly from the frame (10) to the ground and the motorcycle is supported on its front wheel (4), the kickstand (8) and the lift stand (22), with the rear wheel (6) being elevated from the ground. A support surface (38) between the ears (42) contacts a bottom surface of the frame (10). To move the lift stand (22) into its support position, the motorcycle (2) is tilted to lean toward the kickstand (8) and the leg (24) until the leg (24) contacts the ground. The tilting is continued to allow the kickstand (8) to contact the ground and to allow the weight of the motorcycle (2) to elevate the rear wheel (6) from the ground.

14 Claims, 7 Drawing Figures

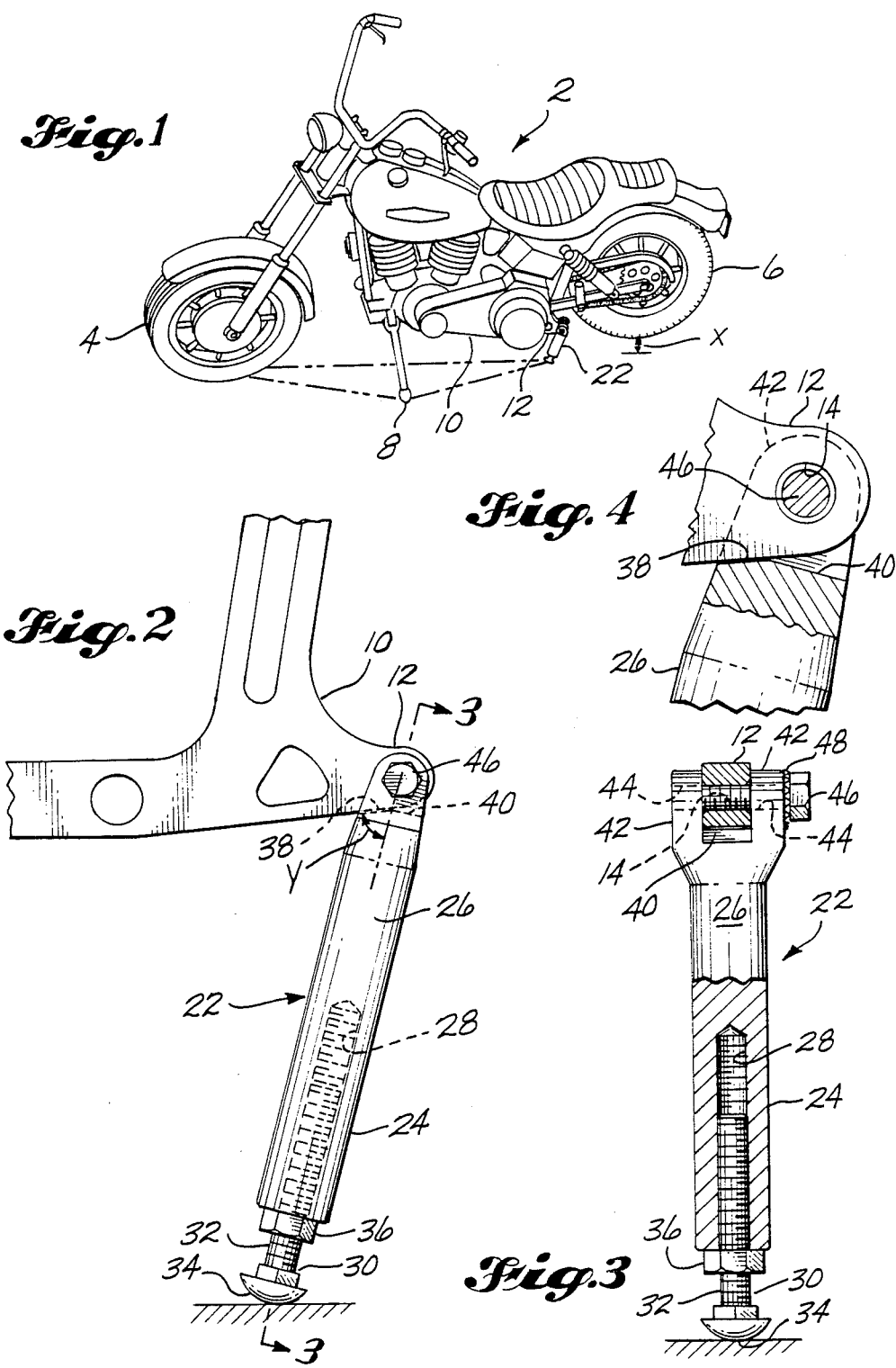

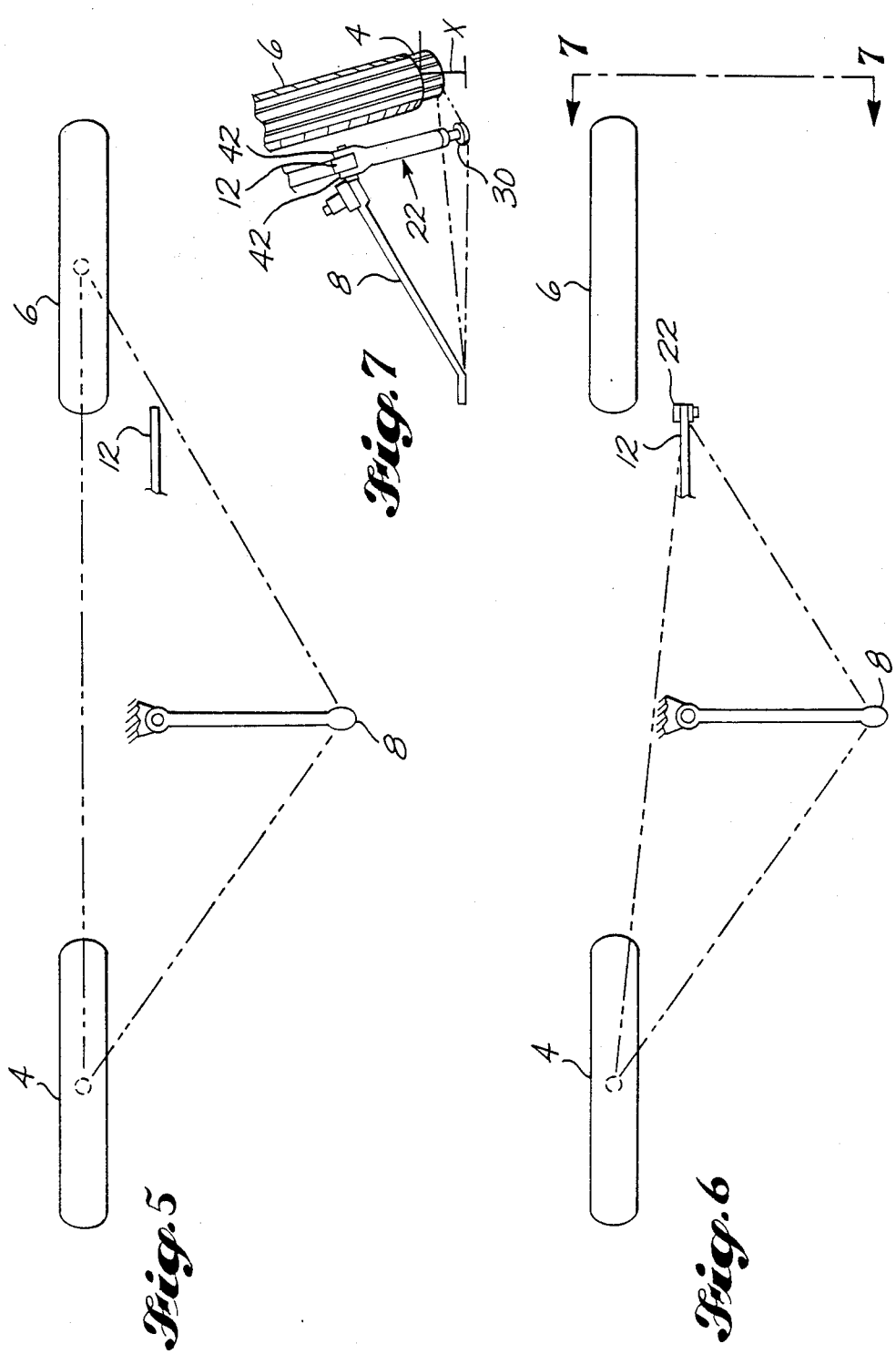

MOTORCYCLE LIFT AND METHOD

DESCRIPTION

1. Technical Field

This invention relates to motorcycle stands and methods for using them and, more particularly, to a motorcycle lift stand and a method for using the lift stand in which the weight of the motorcycle elevates the rear wheel off the ground to move the motorcycle into a position in which it is supported on the lift stand, a kickstand, and the front wheel.

2. Background Art

This invention is directed toward providing a stand and a method for easily elevating the rear wheel of a motorcycle and moving the motorcycle into a position in which it is supported on a lift stand, a kickstand, and the front wheel. Conventional stands for supporting a motorcycle with the rear wheel elevated have the great disadvantage of requiring the operator to lift the weight of the rear end of the motorcycle. For large motorcycles in which the weight is concentrated in the rear, lifting the rear wheel off the ground is very difficult and may require more strength than the operator has. In addition, conventional stands for supporting the motorcycle with the rear wheel elevated may not provide sufficiently stable support for the motorcycle, especially on uneven ground. Unfortunately, the need for a lift stand that can be operated by a single person is greatest in remote areas, where the ground is likely to be uneven.

U.S. Pat. No. 2,285,313, granted June 2, 1942, to L. A. Tagliaboschi, discloses a motorcycle stand for supporting a motorcycle with the front wheel elevated. The Tagliaboschi stand is installed on the side of the motorcycle opposite the side on which the usual "jiffy" or kickstand is located. It appears that the Tagliaboschi stand requires the operator to at least partially lift the front end of the motorcycle in order to move the motorcycle into a position in which it is supported with the front wheel elevated.

U.S. Pat. No. 3,746,113, granted July 17, 1973, to H. Tidwell, discloses a foot rest for a motorcycle that can also be used for braking and steering on rough ground and for supporting the motorcycle in a position in which both wheels are in contact with the ground.

The above patents and the prior art that is discussed and/or cited therein should be studied for the purpose of putting the present invention into proper perspective relative to the prior art.

DISCLOSURE OF THE INVENTION

A subject of this invention is a lift stand for use with a motorcycle of the type having a front wheel, a rear wheel, a frame, and a kickstand on one side of the frame between the front and rear wheels for supporting the motorcycle in a leaning position. According to a basic aspect of the invention, the lift stand comprises a leg and attaching means for attaching the leg. The leg includes a ground-contacting foot at one of its ends. The attaching means attaches the leg to a rear portion of said one side of the frame rearward of the kickstand and forward of the rear wheel. The lift stand has a support position in which the foot is in contact with the ground, the leg extends downwardly from the frame to the ground, and the motorcycle is supported on its front wheel, the kickstand, and the lift stand, with the rear wheel being elevated from the ground. The lift stand is sufficiently close to the rear wheel and sufficiently long to cause, when the motorcycle is leaned toward said one side of the frame to move the lift stand toward its support position, the center of gravity of the motorcycle to be laterally outside and forward of the lift stand and the lift stand to contact the ground before the kickstand makes contact with the ground.

According to another aspect of the invention, the lift stand is pivotable with respect to the frame about an axis that is transverse of the general plane of the rear wheel. The leg further includes a support surface on the other end of the leg opposite the foot end. This support surface is spaced from said axis. The support surface is in supporting contact with said rear portion of said one side of the frame and the leg extends downwardly and forwardly when the lift stand is in its support position.

In the preferred embodiment, the support surface is essentially flat and slopes downwardly and forwardly toward a front edge portion of the leg to form an acute angle with the longitudinal axis of the leg. Preferably, the end of the leg on which the support surface is located includes a rear flat surface portion which is essentially perpendicular to the longitudinal axis of the leg and from the forward edge of which the support surface so slopes.

According to a preferred aspect of the invention, the attaching means comprises a pair of opposing ears projecting upwardly from opposite sides of said other end of the leg. These ears are spaced laterally apart for receiving said rear portion of said one side of the frame therebetween. Each of the ears has a hole extending laterally therethrough, and these holes are coaxial. The attaching means also includes a screw member that extends through one of the coaxial holes, a prexisting hole in the frame for attaching various accessories, and the other of the coaxial holes when the leg is attached to the frame. Preferably, the ears are formed integrally with the leg. Also preferably, the support surface is positioned between the ears, is essentially flat, and slopes downwardly and forwardly toward a front edge portion of the leg to form an acute angle with the longitudinal axis of the leg.

According to another preferred aspect of the invention, the lift stand further comprises adjusting means for adjusting the longitudinal position of the foot with respect to the rest of the leg to adjust the overall length of the leg. In the preferred embodiment, the leg further comprises a main shaft, and the adjusting means comprises an externally threaded shaft portion of the foot and an internally threaded passageway in the main shaft for adjustably receiving the threaded shaft portion. Preferably, the foot includes an enlarged diameter lower end portion that is formed integrally with the threaded shaft portion and that has a rounded lower surface which contacts the ground when the lift stand is in its support position.

Another subject of the invention is a method of elevating the rear wheel of a motorcycle or the like of the type having a front wheel, a rear wheel, a frame, and a kickstand on one side of the frame between the front and rear wheels for supporting the motorcycle in a leaning position, and of supporting the motorcycle with the rear wheel elevated. According to a basic method aspect of the invention, the method comprises moving the kickstand into a support position and holding the motorcycle in a position in which it leans slightly toward the other side of the frame opposite said one side. A support leg is positioned in a position in which it is attached to a rear portion of the frame on the same side of the frame as the kickstand behind the kickstand and forward of the rear wheel, and in which it extends downwardly from top to bottom. The motorcycle is tilted to lean toward the kickstand and the support leg until the bottom of the support leg contacts the ground. The tilting of the motorcycle toward the kickstand is continued to allow the kickstand to contact the ground, and the weight of the motorcycle is allowed to elevate the rear wheel of the motorcycle from the ground. The kickstand, support leg, and front wheel are allowed to support the motorcycle with the rear wheel elevated.

According to another method aspect of the invention, the method comprises supporting the motorcycle on both wheels and the kickstand. A support leg is pivotably attached to a rear portion of the frame on the same side of the frame as the kickstand behind the kickstand and forward of the rear wheel. The support leg is placed in a position in which it extends downwardly and rearwardly. The motorcycle is tilted off the kickstand and into a position in which it leans slightly toward the other side of the frame opposite said one side to allow the support leg to hang essentially straight down. The support leg is pivoted forwardly and held in a position in which it is angled downwardly and forwardly from top to bottom, and in which a support surface on the leg is adjacent to a bottom surface of the frame. The motorcycle is tilted to lean toward the kickstand and the support leg until the bottom of the support leg contacts the ground. The tilting of the motorcycle toward the kickstand is continued to allow the kickstand to contact the ground, and the weight of the motorcycle is allowed to elevate the rear wheel of the motorcycle from the ground. The kickstand, support leg, and front wheel are allowed to support the motorcycle with the rear wheel elevated.

It should be obvious that the method and apparatus of the present invention provide a means by which a single person can easily elevate the rear wheel of a motorcycle and place the motorcycle in a position in which it is supported with the rear wheel elevated. Since the motorcycle only needs to be tilted by the person using the method and/or apparatus of the present invention, and since there is no need to lift any portion of the motorcycle, the method and apparatus of the present invention are suitable for use with large and heavy motorcycles irrespective of the physical strength of the user. Moreover, since the method and apparatus of the present invention can easily be used by a single person without mechanical assistance, the method and apparatus are well suited for use in such situations as changing a rear tire on a remote country road.

The method and apparatus of the invention also provide a means for supporting the motorcycle in a very stable position with the rear wheel elevated. In embodiments of the invention in which the lift stand is pivotable with respect to the frame, the stability of the support position is maintained by the provision of the support surface and the positioning of the leg of the lift stand so that it extends downwardly and forwardly from the frame to the ground. This arrangement automatically counteracts any tendency of the lift stand to pivot out of its support position.

Pivotably attaching the lift stand has the advantage of permitting the lift stand to be carried attached to the frame but secured in a retracted position so that it is ready to be pivoted into its support position should the need arise. The preferred attaching means also has the advantages of requiring only one screw so that attachment is quick and easy, and of making use of a preexisting hole so that no modification of the motorcycle is required.

The apparatus of the invention has the additional advantages of being relatively simple in construction, lightweight, and compact.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of a motorcycle that is being supported on its front wheel, a kickstand, and the preferred embodiment of the lift stand of the invention.

FIG. 2 is a front elevational view of a rear portion of the motorcycle frame shown in FIG. 1 and the preferred embodiment of the lift stand in its support position.

FIG. 3 is a sectional view taken substantially along the line 3—3 in FIG. 2, with some parts shown in elevation.

FIG. 4 is a fragmentary front elevational view of a top portion of the lift stand and the portion of the frame to which it is attached, as shown in FIG. 2, with some parts shown in section.

FIG. 5 is a schematic top plan view of a motorcycle being supported on its two wheels and a kickstand, showing the location of the portion of the frame to which the lift stand is preferably connected.

FIG. 6 is a schematic top plan view of a motorcycle being supported on its front wheel, a kickstand, and the preferred embodiment of the lift stand.

FIG. 7 is a fragmentary rear elevational view taken along the line 7—7 in FIG. 6.

BEST MODE FOR CARRYING OUT THE INVENTION

The drawings show a lift stand 22 that is constructed according the invention and that also constitutes the best mode of the apparatus of the invention currently known to the applicant. FIG. 1 shows the lift stand 22 in a typical installation in which it is being used to support a motorcycle 2 on the motorcycle's front wheel 4, a kickstand 8, and the lift stand 22, with the rear wheel 6 of the motorcycle 2 elevated. The lift stand 22 is attached to a rear portion 12 of the frame 10 of the motorcycle 2. As is clearly shown by the drawings, the lift stand 22 is attached to the same side of the frame 10 as the kickstand 8. The kickstand 8 is of the type that is standard equipment on most motorcycles and is attached to the frame of the motorcycle between the front and rear wheels for supporting the motorcycle in a leaning position. The lift stand 22 is attached rearward of the kickstand and forward of the rear wheel.

The lift stand of the invention basically includes a support leg and means for attaching the leg to the frame of a motorcycle. In the preferred embodiment shown in the drawings, the leg 24 includes a main shaft 26 that has a ground-contacting foot 30 at one of its ends. Preferably, the foot 30 has a rounded lower surface 34 which contacts the ground when the lift stand 22 is in its support position shown in FIGS. 1–4, 6 and 7.

The preferred embodiment of the leg 24 further includes a support surface 38 on the upper end of the leg 24 opposite the foot end of the leg 24. In the preferred embodiment of the apparatus of the invention, the lift stand 22 is pivotable with respect to the frame 10 of the motorcycle 2 about an axis that is transverse of the general plane of the rear wheel 6. The support surface 38 is spaced from this axis. When the lift stand 22 is in its support position, the support surface 38 is in supporting contact with a bottom surface of the rear portion 12 of the frame 10 to which the leg 24 is attached.

As shown in the drawings, the preferred embodiment of the support surface 38 is essentially flat and slopes downwardly and forwardly toward a front edge portion of the main shaft 26 of the leg 24. The surface 38 forms an acute angle with the longitudinal axis of the leg 24. Preferably, the angle Y between the longitudinal axis and the general plane of the support surface 38 is approximately 63 degrees. As is most clearly shown in FIGS. 2 and 4, in the preferred embodiment the upper end of the leg 24 also includes a rear flat surface portion 40. This surface portion 40 is essentially perpendicular to the longitudinal axis of the leg 24. The support surface 38 slopes downwardly and forwardly from the forward edge of the rear flat surface portion 40.

As described above, the leg 24 is attached to a rear portion 12 of the same side of the frame 10 that the kickstand 8 is attached to and is positioned rearward of the kickstand 8 and forward of the rear wheel 6. The leg 24 could be so attached in a variety of ways without departing from the spirit and scope of the present invention. However, it is preferable that the attaching of the lift stand 22 to the motorcycle 2 require no modification of the motorcycle 2. Therefore, in the preferred embodiment shown in the drawings the lift stand 22 is attached by making use of a preexisting hole 14 in the frame 10. This preexisting hole 14 is commonly included as a standard feature on motorcycle frames to provide a means for attaching various accessories. An example of a frame with such a preexisting hole is the Harley Davidson 74 inch Swingarm frame.

The preferred embodiment of the attaching means comprises a pair of opposing ears 42 that project upwardly from opposite sides of the main shaft 26 of the leg 24 at the end of the leg 24 opposite the foot 30. The ears 42 are spaced laterally apart, and each ear 42 has a hole 44 extending laterally therethrough. The two holes 44 in the two ears 42 are coaxial. When the leg 24 is attached to the frame 10, the ears 42 are positioned on opposite sides of the rear portion 12 of the frame 10, which rear portion 12 includes the preexisting hole 14. With the rear portion 12 of the frame 10 and the preexisting hole 14 received in the lateral space between the two ears 42, a screw member 46 secures the ears 42 and the frame 10 together. The screw member 46 extends through one of the coaxial holes 44, the preexisting hole 14 in the frame 10, and the other of the coaxial holes 44. The second coaxial hole 44 is threaded to threadedly engage the outer end of the screw member 46. A lock washer 48 is positioned between the head of the screw member and the ear 42 that includes the first coaxial hole 44 to secure the screw member 46 in place.

The essentially flat support surface 38 is positioned between the ears 42. The support surface 38 slopes downwardly and forwardly toward a front edge portion of the main shaft 26 of the leg 24 to form an acute angle, preferably approximately 63 degrees, with the longitudinal axis of the main shaft 26 of the leg 24. When the lift stand 22 is attached to the motorcycle 2, the support surface 38 slopes toward the front end of the motorcycle 2. In the preferred embodiment shown in the drawings, the flat rear surface 40 at the upper end of the leg 24 extends from the rear edge of the main shaft 26 of the leg 24 forwardly approximately ⅔ of the distance between the rear edge and the front edge of the main shaft 26. The support surface 38 extends forwardly the remaining ⅓ of the distance. Both the support surface 38 and the rear flat surface 40 extend laterally from the base of one ear 42 to the base of the other ear 42.

The preferred construction of the attaching means provides several advantages. First, as mentioned above, the lift stand 22 can be attached to the motorcycle 2 without modifying the motorcycle 2 in any way. Second, the lift stand 22 can be attached easily by use of a single screw member 46. Third, the leg 24, when attached to the frame 10, is pivotable with respect to the frame 10. Since it is pivotable, the leg 24 can be installed on the motorcycle 2 at any convenient time and left attached to the motorcycle 2 when the motorcycle 2 is in use. To prevent the lift stand 22 from interfering with the normal operation of the motorcycle 2, the lift stand 22 need only be rotated rearwardly into a retracted position and clamped by a standard clamp (not shown) into the retracted position. This procedure insures that the lift stand 22 will always be readily available if a need for it should arise and also allows for a shortened procedure for elevating the rear wheel of the motorcycle in a remote area. These are only a few of the advantages of the preferred construction of the attaching means.

The main shaft 26 of the leg 24 and the ears 42 may be constructed from a variety of materials. For example, they may be constructed from steel with the ears 42 being welded onto the leg 24. Another example is the most preferred construction shown in the drawings. In this construction, the main shaft 26 of the leg 24 and the ears 42 are made of aircraft aluminum, and the ears 42 are formed integrally with the leg 24. The one piece construction eliminates any need for welding at the critical stress points where the ears 42 join the main shaft 26. In addition, the aluminum is lighter (about one pound), slightly more compact, and more attractive than steel.

In the lift stand 22 of the preferred embodiment of the invention, the longitudinal position of the foot 30 with respect to the rest of the leg 24, and in particular with respect to the main shaft 26 of the leg 24, is adjustable. By adjusting the longitudinal position of the foot 30, the overall length of the leg 24 can be adjusted. Preferably, the foot 30 includes an externally threaded shaft portion 32. The main shaft 26 of the leg 24 includes an internally threaded passageway 28. The threaded shaft portion 32 of the foot 30 is threadedly and adjustably received into the passageway 28. A nut 36 is positioned on the threaded shaft portion 32 before the shaft portion 32 is threaded into the passageway 28. The nut 36 is tightened against the main shaft 26 in order to secure the foot 30 in the desired longitudinal position. (See FIG. 3) In order to adjust this longitudinal position, all that is required is to loosen the nut 36, rotate the foot 30 into the desired position, and retighten the nut 36. Of course, this adjusting procedure is carried out when the weight of the motorcycle 2 is not on the lift stand 22.

The preferred embodiment of the foot 30 includes the threaded shaft portion 32 and a head integrally attached to the lower end of the shaft portion 32. This head forms an enlarged diameter lower end portion of the foot 30, and its outer or bottom surface forms the ground-contacting rounded lower surface 34 described above.

The present invention has both apparatus and method aspects. The invention provides a method of elevating the rear wheel of a motorcycle and of supporting the motorcycle with the rear wheel elevated. By use of the method of the invention, the rear wheel may be elevated a distance X that is sufficient to allow emergency repairs to the rear wheel, such as changing the tire. FIGS. 6 and 7 show in broken lines the support triangle formed when the motorcycle 2 is supported with its rear wheel 6 elevated by the lift stand 22. As is clearly shown in FIGS. 6 and 7, the motorcycle is supported on its front wheel 4, its kickstand 8, and the lift stand 22. For purposes of comparison, FIG. 5 shows in broken lines the support triangle formed when the motorcycle 2 is supported on both wheels 4, 6 and the kickstand 8. To aid in the comparison, the position of the rear portion 12 of the frame 10 is indicated in FIG. 5.

The use of the lift stand 22 is not difficult and may easily be carried out by a single person. The kickstand 8 must be moved into its standard support position. This standard support position serves to support the motorcycle in both the position shown in FIG. 5 and the elevated position shown in FIG. 6. The motorcycle 2 is held in a position in which it leans slightly toward the side of the frame 10 opposite the side to which the kickstand 8 is attached. This part of the operation, and in fact the entire operation, is preferably carried out by an operator standing on the side of the morotcycle 2 opposite the kickstand 8. The support leg 24, if it is not already attached, is attached to the rear portion 12 of the frame 10 on the same side of the frame 10 as the kickstand 8 and is positioned to extend downwardly from top to bottom. In this position, the leg 24 is behind the kickstand 8 and forward of the rear wheel 6.

With the kickstand 8 and the lift stand 22 in position to support the motorcycle 2, the motorcycle is tilted to lean toward the kickstand 8 and the support leg 24 until the bottom of the leg 24 contacts the ground. The operator continues to tilt the motorcycle 2 toward the kickstand 8 to allow the kickstand 8 to contact the ground. The weight of the motorcycle 2 elevates the rear wheel 4 from the ground and moves the lift stand 22 all the way into its support position. When the lift stand 22 is in its support position, the rounded bottom 34 of the foot 30 is in contact with the ground, the leg 24 extends downwardly from the frame 10 to the ground, and the motorcycle 2 is supported on its front wheel 4, the kickstand 8, and the lift stand 22, with the rear wheel 6 being elevated from the ground.

In the preferred embodiment of the method of the invention, the motorcycle 2 is supported on both wheels 4, 6 and the kickstand 8. The support leg 24 is pivotally attached to the rear portion 12 of the frame 10. As noted above, the attaching of the leg 24 to the frame 10 may be carried out at any time prior to the actual use of the lift stand 22 to support the motorcycle 2 with its rear wheel 6 elevated. With the lift stand 22 attached to the motorcycle 2 and with the motorcycle supported on both wheels 4, 6 and the kickstand 8, the support leg 24 is placed in a position in which it extends downwardly and rearwardly. The motorcycle 2 is then tilted off the kickstand 8 and into a position in which it leans slightly toward the side of the frame 10 opposite the kickstand 8. This allows the leg 24 to hang essentially straight down. The support leg 24 is then pivoted a small distance forwardly and held in a position in which it is angled downwardly and forwardly from top to bottom, and in which the support surface 38 is adjacent to a bottom surface of the rear portion 12 of the frame 10. With the leg 24 in this position ready to support the motorcycle 2, the remainder of the operation, commencing with the tilting of the motorcycle 2 to lean toward the kickstand 8 and the leg 24, is carried out as described above. When the lift stand 22 reaches its support position, the leg 24 extends downwardly and forwardly from the frame 10 to the ground.

When practicing the method of the invention, the operator should of course always observe standard safety precautions. For example, the front wheel should always be blocked when the rear wheel is to be elevated. In addition, if the ground is soft, a hard surface, such as a board or a rock, should be placed under both the kickstand and the lift stand.

In all embodiments of the method and apparatus of the invention, the lift stand 22 must of course be positioned and dimensioned to function properly. As best shown in FIG. 1, the lift stand 22 is positioned quite close to and just forward of the rear wheel 6. The lift stand 22 is sufficiently close to the rear wheel 6 and sufficiently long so that, when the motorcycle 2 is leaned toward the kickstand 8, the center of gravity of the motorcycle 2 is laterally outside and forward of the lift stand 22 and the lift stand 22 contacts the ground before the kickstand 8 makes contact with the ground. This insures that the motorcycle 2 will continue to tilt toward the kickstand 8 and that the weight of the motorcycle 2 will elevate the rear wheel 6. Since the weight of the motorcycle 2 elevates the rear wheel 6, there is no need for the operator to lift the heavy rear end of the motorcycle 2.

Once the weight of the motorcycle 2 has moved the lift stand 22 fully into its support position, the motorcycle is very stably supported, as shown in FIG. 6, with the rear wheel 6 elevated. In embodiments of the invention in which the leg 24 is pivotably attached to the frame 10, the contact between the frame 10 and the support surface 38 and the angling of the leg 24 preserve the stability of the support.

Although the preferred embodiments of the method and apparatus of the invention have been illustrated and described, it is to be understood by those skilled in the art to which this invention is addressed that various changes, modifications, and omissions in form and detail may be made without departing from the spirit and scope of the present invention as defined by the following claims.

What is claimed is:

1. For use with a motorcycle of the type having a front wheel, a rear wheel, a frame, and a kickstand on one side of the frame between the front and rear wheels for supporting the motorcycle in a leaning position, a lift stand comprising:

a leg including a ground-contacting foot at one of its ends; and attaching means for attaching the leg to a rear portion of said one side of the frame rearward of the kickstand and forward of the rear wheel;

said lift stand having a support position in which the foot is in contact with the ground, the leg extends downwardly from the frame to the ground, and the motorcycle is supported on its front wheel, the kickstand, and the lift stand, with the rear wheel being elevated from the ground; and said lift stand being sufficiently close to the rear wheel and sufficiently long to cause, when the motorcycle is leaned toward said one side of the frame to move the lift stand toward its support position, the center of gravity of the motorcycle to be laterally outside and forward of the lift stand and the lift stand to contact the ground before the kickstand makes contact with the ground.

2. A lift stand as described in claim 1, in which the lift stand is pivotable with respect to the frame about an axis that is transverse of the general plane of the rear wheel; the leg further includes a support surface on the other end of the leg opposite said one end of the leg, said support surface being spaced from said axis; and the support surface is in supporting contact with said rear portion of said one side of the frame and the leg extends downwardly and forwardly when the lift stand is in its support position.

3. A lift stand as described in claim 2, in which the support surface is essentially flat and slopes downwardly and forwardly toward a front edge portion of the leg to form an acute angle with the longitudinal axis of the leg.

4. A lift stand as described in claim 3, wherein said other end of the leg includes a rear flat surface portion which is essentially perpendicular to the longitudinal axis of the leg and from the forward edge of which the support surface so slopes.

5. A lift stand as described in claim 2, in which the attaching means comprises a pair of opposing ears projecting upwardly from opposite sides of said other end of the leg, said ears being spaced laterally apart for receiving said rear portion of said one side of the frame therebetween, each of said ears having a hole extending laterally therethrough, and said holes being coaxial; and a screw member that extends through one of said coaxial holes, a preexisting hole in the frame for attaching various accessories, and the other of said coaxial holes when the leg is attached to the frame.

6. A lift stand as described in claim 5, in which the ears are formed integrally with the leg.

7. A lift stand as described in claim 5, in which the support surface is positioned between said ears, is essentially flat, and slopes downwardly and forwardly toward a front edge portion of the leg to form an acute angle with the longitudinal axis of the leg.

8. A lift stand as described in claim 1, further comprising adjusting means for adjusting the longitudinal position of the foot with respect to the rest of the leg to adjust the overall length of the leg.

9. A lift stand as described in claim 8, in which the leg further comprises a main shaft; and the adjusting means comprises an externally threaded shaft portion of the foot, and an internally threaded passageway in said main shaft for adjustably receiving said threaded shaft portion.

10. A lift stand as described in claim 9, in which the foot includes an enlarged diameter lower end portion that is formed integrally with said threaded shaft portion and that has a rounded lower surface which contacts the ground when the lift stand is in its support position.

11. A method of elevating the rear wheel of a motorcycle or the like of the type having a front wheel, a rear wheel, a frame, and a kickstand on one side of the frame between the front and rear wheels for supporting the motorcycle in a leaning position, and of supporting the motorcycle with the rear wheel elevated, comprising:
providing a support leg attached to a rear portion of the frame on the same side of the frame as the kickstand behind the kickstand and forward of the rear wheel;
moving the kickstand into a support position;
holding the motorcycle in a position in which it leans slightly toward the other side of the frame opposite said one side;
positioning the support leg in a position in which it extends downwardly from top to bottom;
tilting the motorcycle to lean toward the kickstand and the support leg until the bottom of the support leg contacts the ground;
continuing to tilt the motorcycle toward the kickstand to allow the kickstand to contact the ground, and allowing the weight of the motorcycle to elevate the rear wheel of the motorcycle from the ground; and
allowing the kickstand, support leg, and front wheel to support the motorcycle with the rear wheel elevated.

12. A method as recited in claim 11, which further comprises carrying the support leg detached from the motorcycle until the support leg is needed to elevate the rear wheel and support the motorcycle.

13. A method of elevating the rear wheel of a motorcycle or the like of the type having a front wheel, a rear wheel, a frame, and a kickstand on one side of the frame between the front and rear wheels for supporting the motorcycle in a leaning position, and of supporting the motorcycle with the rear wheel elevated, comprising:
providing a support leg pivotably attached to a rear portion of the frame on the same side of the frame as the kickstand behind the kickstand and forward of the rear wheel;
supporting the motorcycle on both wheels and the kickstand;
placing the support leg in a position in which it extends downwardly and rearwardly;
tilting the motorcycle off the kickstand and into a position in which it leans slightly toward the other side of the frame opposite said one side to allow the support leg to hang essentially straight down;
pivoting the support leg forwardly and holding it in a position in which it is angled downwardly and forwardly from top to bottom, and in which a support surface on the leg is adjacent to a bottom surface of the frame;
tilting the motorcycle to lean toward the kickstand and the support leg until the bottom of the support leg contacts the ground;
continuing to tilt the motorcycle toward the kickstand to allow the kickstand to contact the ground, and allowing the weight of the motorcycle to elevate the rear wheel of the motorcycle from the ground; and
allowing the kickstand, support leg, and front wheel to support the motorcycle with the rear wheel elevated.

14. A method as recited in claim 13, which further comprises carrying the support leg detached from the motorcycle until the support leg is needed to elevate the rear wheel and support the motorcycle.

* * * * *